Feb. 28, 1967 C. BOYD 3,306,034
METHOD AND DEVICE FOR EXHAUST GAS PURIFICATION
Filed May 17, 1965 7 Sheets-Sheet 1
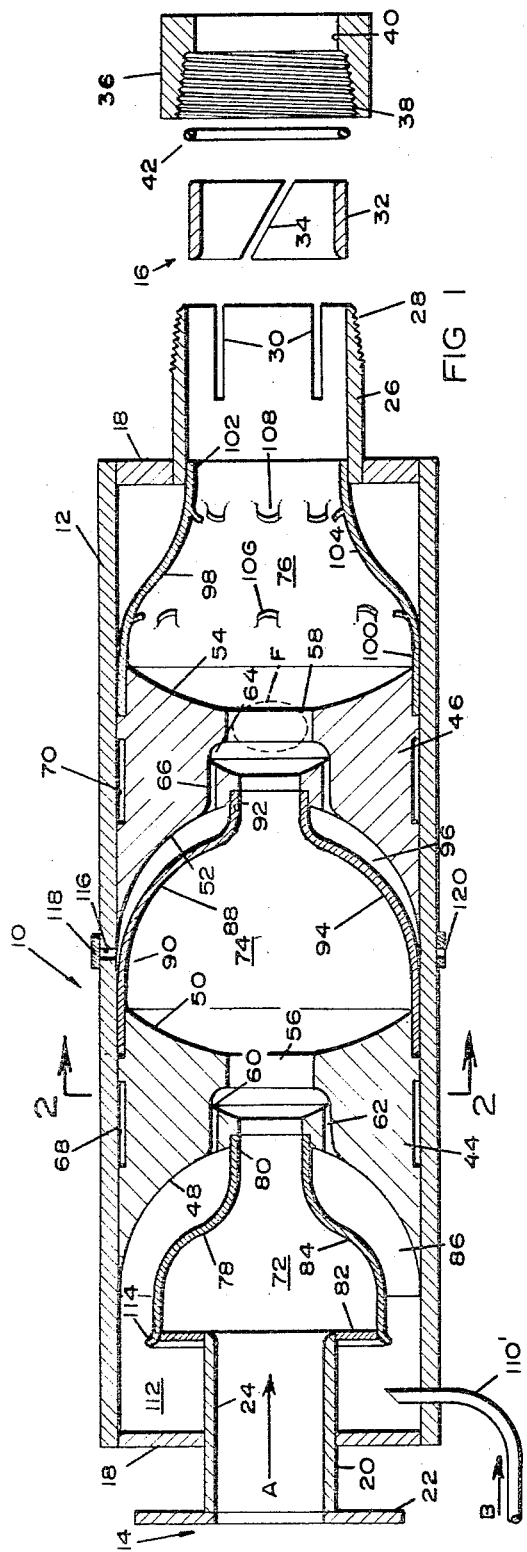
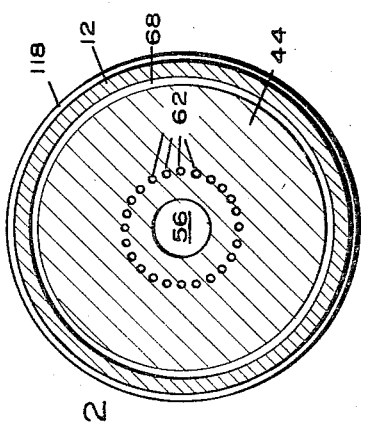
INVENTOR
Clarence Boyd
BY Jacobi & Davidson
ATTORNEYS INVENTOR
CLARENCE BOYD
BY Jacobi & Davidson
ATTORNEYS Feb. 28, 1967  C. BOYD  3,306,034
METHOD AND DEVICE FOR EXHAUST GAS PURIFICATION
Filed May 17, 1965

INVENTOR
CLARENCE BOYD

BY Jacobi & Davidson

ATTORNEYS

Feb. 28, 1967 C. BOYD 3,306,034
METHOD AND DEVICE FOR EXHAUST GAS PURIFICATION
Filed May 17, 1965 7 Sheets-Sheet 4

INVENTOR
CLARENCE BOYD
BY Jacobi & Davidson
ATTORNEYS

Feb. 28, 1967  C. BOYD  3,306,034
METHOD AND DEVICE FOR EXHAUST GAS PURIFICATION
Filed May 17, 1965  7 Sheets-Sheet 5
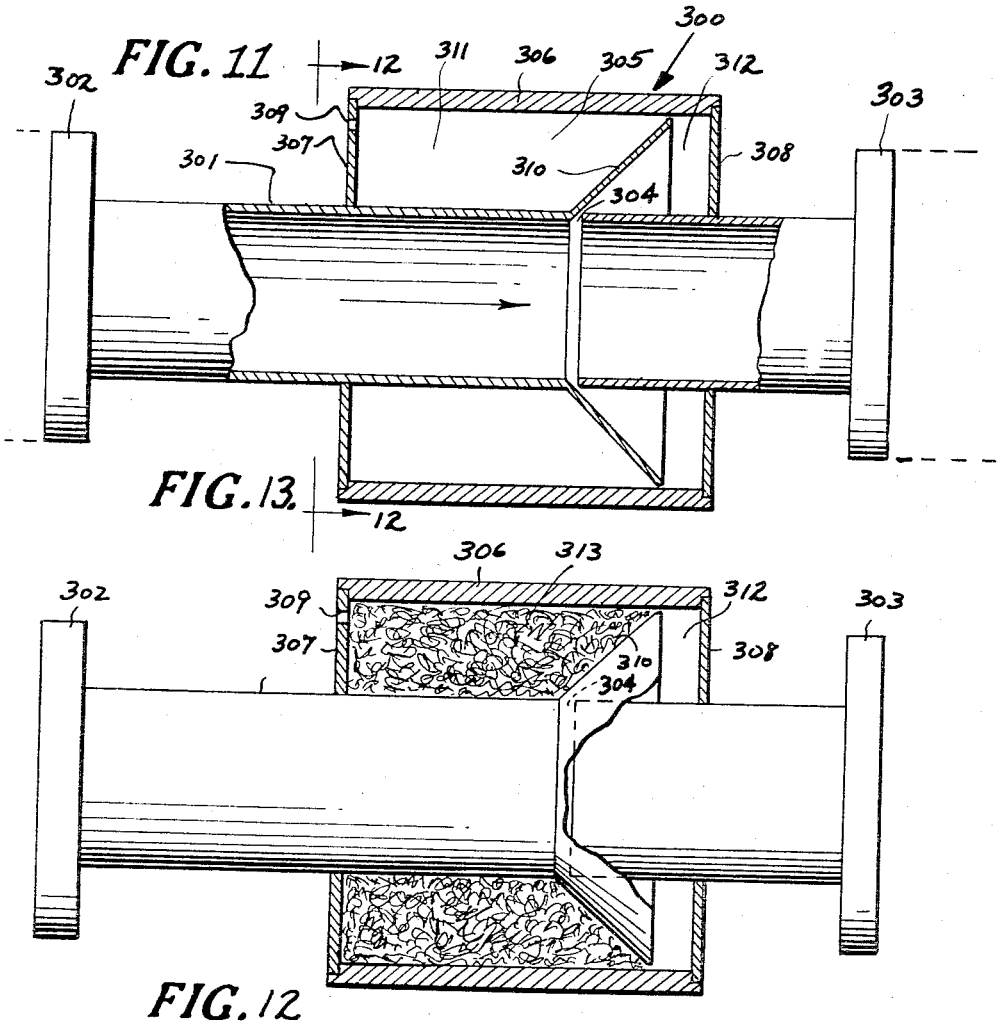
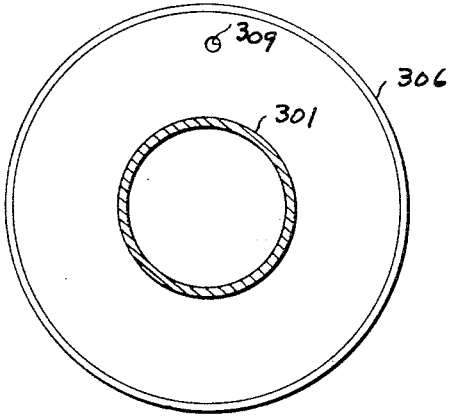
INVENTOR
CLARENCE BOYD
BY Jacobi & Davidson
ATTORNEYS Feb. 28, 1967  C. BOYD  3,306,034
METHOD AND DEVICE FOR EXHAUST GAS PURIFICATION
Filed May 17, 1965  7 Sheets-Sheet 6
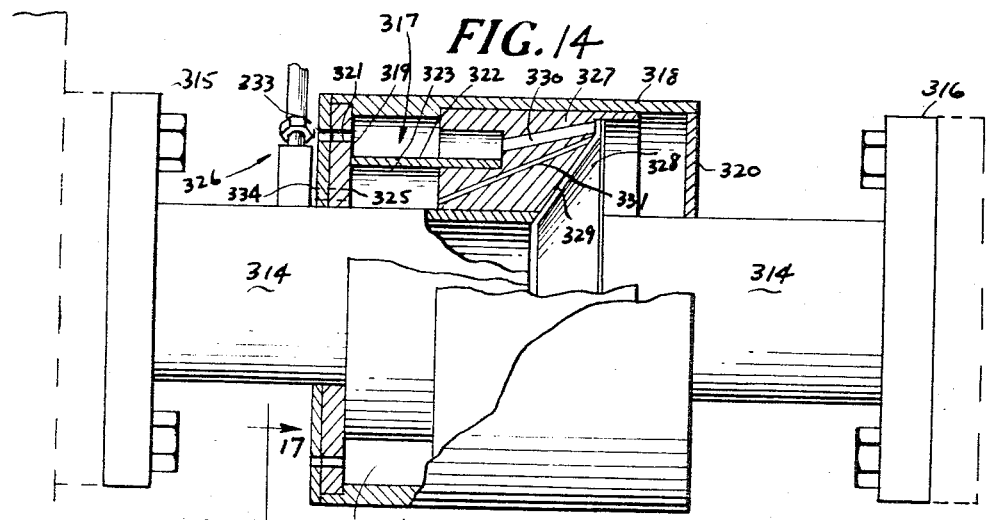
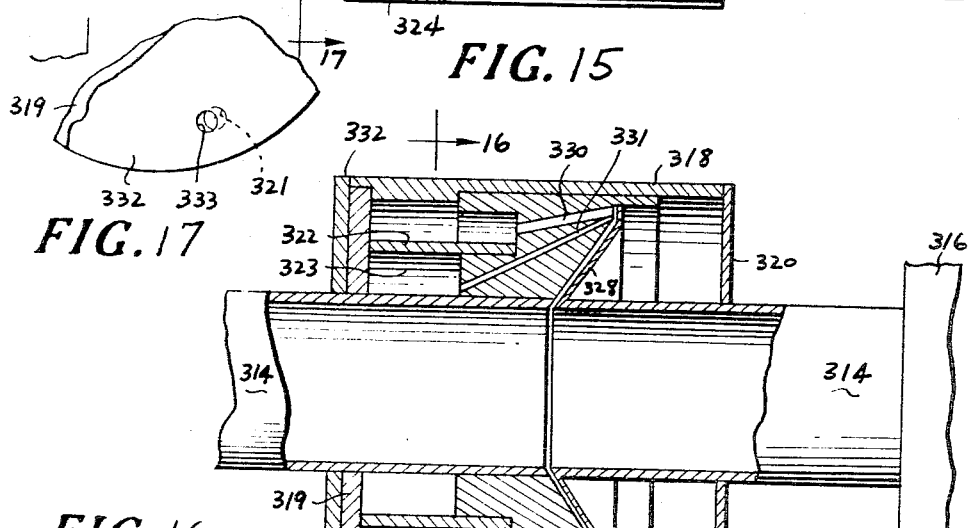
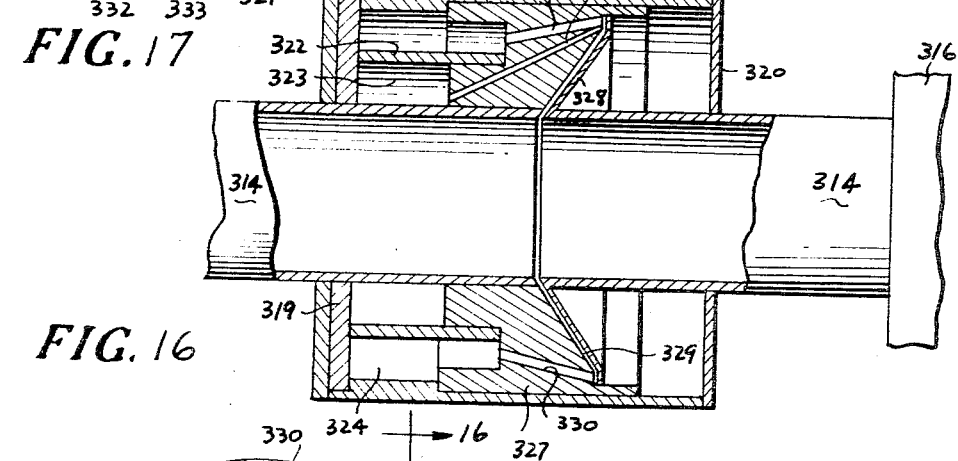
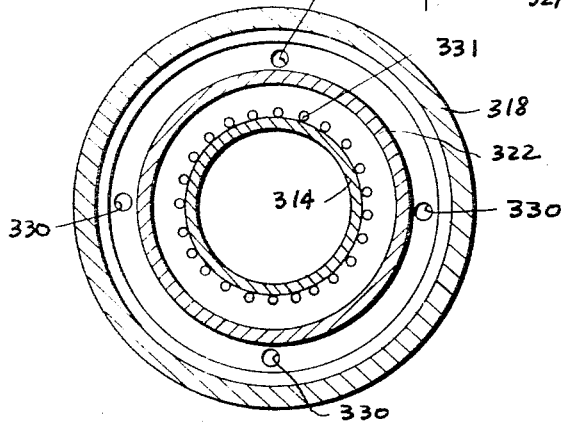
INVENTOR
CLARENCE BOYD
BY Jacobi & Davidson
ATTORNEYS Feb. 28, 1967   C. BOYD   3,306,034
METHOD AND DEVICE FOR EXHAUST GAS PURIFICATION
Filed May 17, 1965   7 Sheets-Sheet 7
FIG. 18
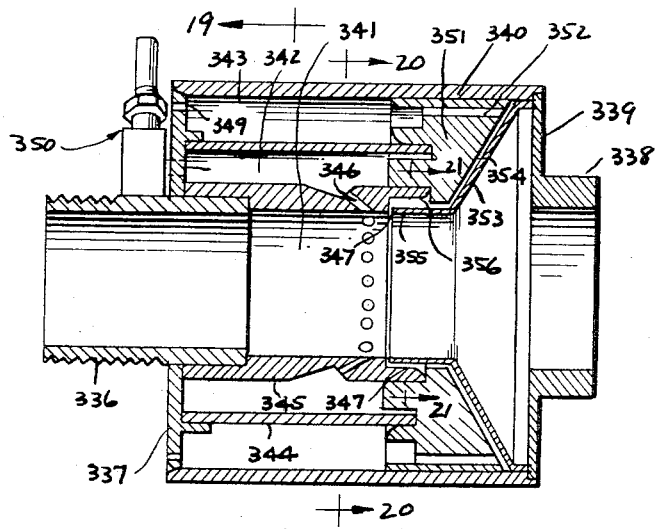
FIG. 19    FIG. 20
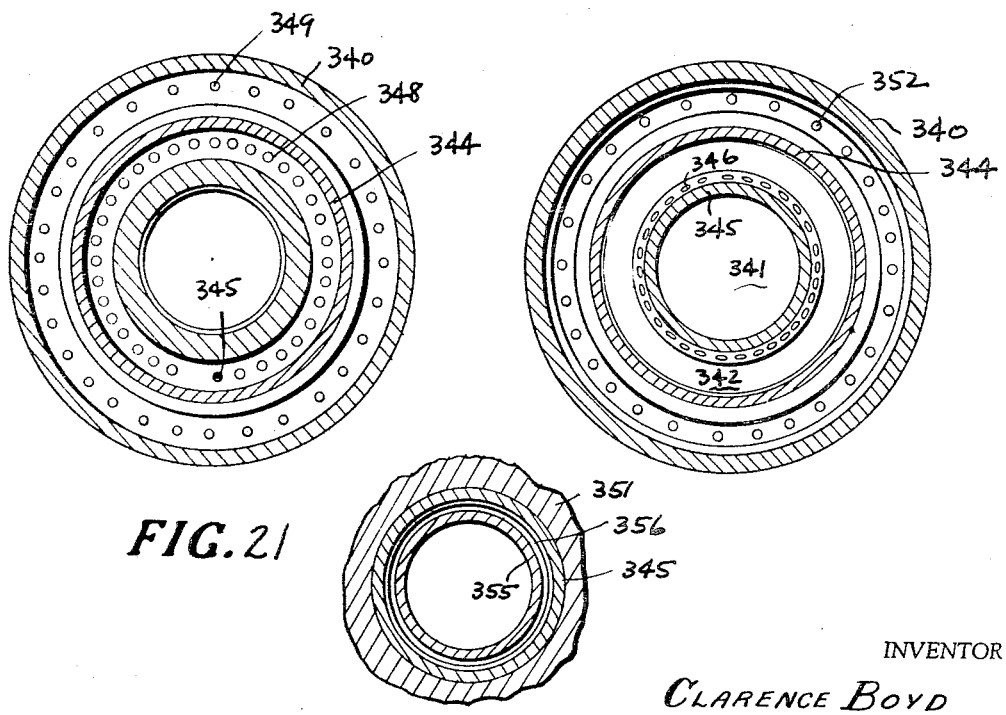
FIG. 21
INVENTOR
CLARENCE BOYD
BY Jacobi & Davidson
ATTORNEYS United States Patent Office 3,306,034
Patented Feb. 28, 1967

3,306,034
METHOD AND DEVICE FOR EXHAUST
GAS PURIFICATION
Clarence Boyd, 5325 Belt Road NW.,
Washington, D.C. 20015
Filed May 17, 1965, Ser. No. 456,459
31 Claims. (Cl. 60—30)

This application is a continuation-in-part of my following prior applications: (1) Ser. No. 63,342, filed Oct. 18, 1960, now forfeited; (2) Ser. No. 276,124, filed Apr. 22, 1963, as a continuation of Ser. No. 63,342; (3) Ser. No. 202,899, filed June 15, 1962, now abandoned; and (4) Ser. No. 285,191, filed May 27, 1963, as a continuation of Ser. No. 202,899.

The present invention relates to a method and device for purification of exhaust gases through the utilization of spontaneous combustion. More particularly, the present invention relates to a smoke and odor eliminator or exhaust gas purifier and to a method and device for treating exhaust vapors emitted from internal combustion engines in a manner to destroy smoke, odors, and the like.

Air pollution has become the most serious public health problem facing the United States. The rate of growth of urban population and industrialization has resulted in immense increase in the rate at which foreign materials are expelled into the atmosphere, and, in many parts of the country, weather conditions are such that air circulation will not remove these impurities sufficiently rapidly. Under certain particularly stagnant conditions, intolerable levels of pollutant accumulate.

In most cases, pollution can be traced to industry and many successful efforts have been made to reduce the level of pollution from such sources, but at least one type of pollution, one of the most serious and potentially dangerous, remains unconquered. It is the so-called Los Angeles type, so named because it was originally observed at Los Angeles, Calif. This type of pollution has been called "smog." Actually the term "smog" is used generally for air pollution, and is derived from "smoke" and "fog" but, for the present application, it will be limited to use with the Los Angeles type pollution.

This type of pollution is a haze or mist which forms in the atmosphere under stagnant air conditions and is accompanied by damage to crops and eye irritation. Analysis of air samples has shown that the mist is a dispersion in the atmosphere of extremely small gum-like particles and that the formation of this haze is associated with a large increase in the concentration of ozone and other oxidizing materials and a decrease in the concentration of hydrocarbons, particularly the unsaturated hydrocarbons. Investigation of this pollution, including a survey of the various pollution sources in the Los Angeles area, ultimately led to experiments in which all of the observable characteristics of smog were reproduced by irradiating automobile exhaust gases dispersed in air in closed chambers, with light similar to sunlight. It was found that the smog was not caused by automobile exhaust alone, but by a chemical reaction initiated by sunlight.

Other investigations have shown that the composition of automobile exhausts included nitrogen oxides, particularly nitrogen dioxide, carbon monoxide and unburned gasoline, in addition to water vapor and carbon dioxide. Although the exact nature of the smog-forming reaction has not yet been fully deduced, it appears that the important reactants are nitric oxide and unburned gasoline, and, of the unburned gasoline, the unsaturated hydrocarbons are believed to be the most important.

This experimental work and continuing analyses of the Los Angeles atmosphere have developed one other very important point. The chemical reaction which results in the formation of smog may result in the consumption of a significant part of the carbon monoxide expelled into the atmosphere. At nighttime, when the smog-forming reaction cannot take place because of the lack of sunlight, it is possible that the concentration of carbon monoxide may arise to alarming levels.

Thus, in order to prevent the formation of smog, it becomes necessary to destroy either nitrogen oxides or unburned gasoline formed in automobile engines before they reach the atmosphere and, because the prevention of smog may permit carbon monoxide levels to rise, it becomes necessary to remove or prevent the expulsion of carbon monoxide.

The purification of vehicular engine exhausts also causes difficulty in cities not immediately concerned with this type of smog. In congested downtown areas, where traffic moves slowly, vehicular exhausts may generate too rapidly to be removed by normal air flow. There is an accumulation of unpleasant odors and, at times, smoke which is a public nuisance. This is especially a matter of concern when vehicles operate with diesel fuel.

Another source of difficulty is the crankcase. A crankcase ventilating system is provided in most internal combustion engines, and this permits escape of vapors of oil and fuel which leaks past the pistons. A number of devices have been designed to inject this emission into the carburetor. In many cases this can interfere with carburetion and require difficult adjustments, and the arrangement is not wholly satisfactory. It is much more desirable to burn the crankcase emission.

A number of devices have been explored for the purpose of purifying automobile exhaust, and generally they depend upon an oxidation of the exhaust gases to remove carbon monoxide and hydrocarbons. Work on such devices has advanced sufficiently far that the State of California has enacted legislation permitting the State Department of Public Health to approve exhaust purifiers for use and compelling the use of such devices on automobiles after a suitable number have been approved. The present indications are that an overall reduction of 80% of hydrocarbon and 60% of carbon monoxide in exhaust gases will be required. Additionally, the Congress of the United States has been conducting extensive hearings and investigations relative to the problems of air pollution, particularly as created by automotive vehicles.

Basically, there are two types of devices which have previously been proposed, namely, catalytic converters and after-burners. The catalytic converters are expensive since they employ catalysts which might cost thirty or forty dollars to replace every fifteen thousand miles or so. The after-burners generally have a spark plug or other form of igniter which heats a mixture of exhaust gases and fresh air introduced into the exhaust stream, and sometimes include blowers to force in fresh air. These after-burners will be more expensive initially but would last the life of an automobile.

The difficulty with any of such prior art devices is that they are very expensive and require a considerable amount of space. Many are not fully reliable, under any circumstances, and particularly under the variable conditions encountered by an internal combustion engine in an automotive vehicle. As will be set forth more fully hereinafter, it has been found that hydrocarbon formation in a vehicle exhaust varies radically, depending upon whether the vehicle is idling, cruising, accelerating or decelerating. Naturally, the optimum purification device should be effective under all such operational conditions, but to be in any way acceptable, a purification device must be effective under at least one of such conditions.

With the foregoing matter firmly in mind, it is, therefore, an object of the present invention to overcome the difficulties and deficiencies associated with prior art purification methods and devices, and to provide in their stead, an improved method and device for the purification of exhaust gases.

Another object of the present invention is to provide an exhaust gas purification method and device which eliminates the need for catalyst additives and/or special ignition devices for purifying the exhaust gas, and which instead accomplishes purification through spontaneous combustion of the exhaust gases themselves.

Another object of the present invention is to provide a purifcation method and device which successfully purifies both engine exhaust gases and crankcase fumes.

Further objects of the present invention include the provision of a purification method and device which: (a) is small and inexpensive, yet is rugged and is capable for operating for extended durations of time; (b) operates reliably to reduce exhaust hydrocarbons below the level considered to be dangerous and undesirable; (c) is susceptible to mass production techniques; (d) does not utilize any moving parts; (e) requires no special chemical additives; and (f) does not require any independent ignition mechanism.

Other objects, advantages and salient features of the present invention will become apparent from the following detailed description, which, taken in conjunction with the annexed drawings, discloses the preferred embodiments thereof.

In the drawings:

FIGURE 1 is a cross-sectional elevational view of the preferred embodiment of the present invention;

FIGURE 2 is a sectional view taken along the line 2—2 of FIGURE 1;

Figure 3:
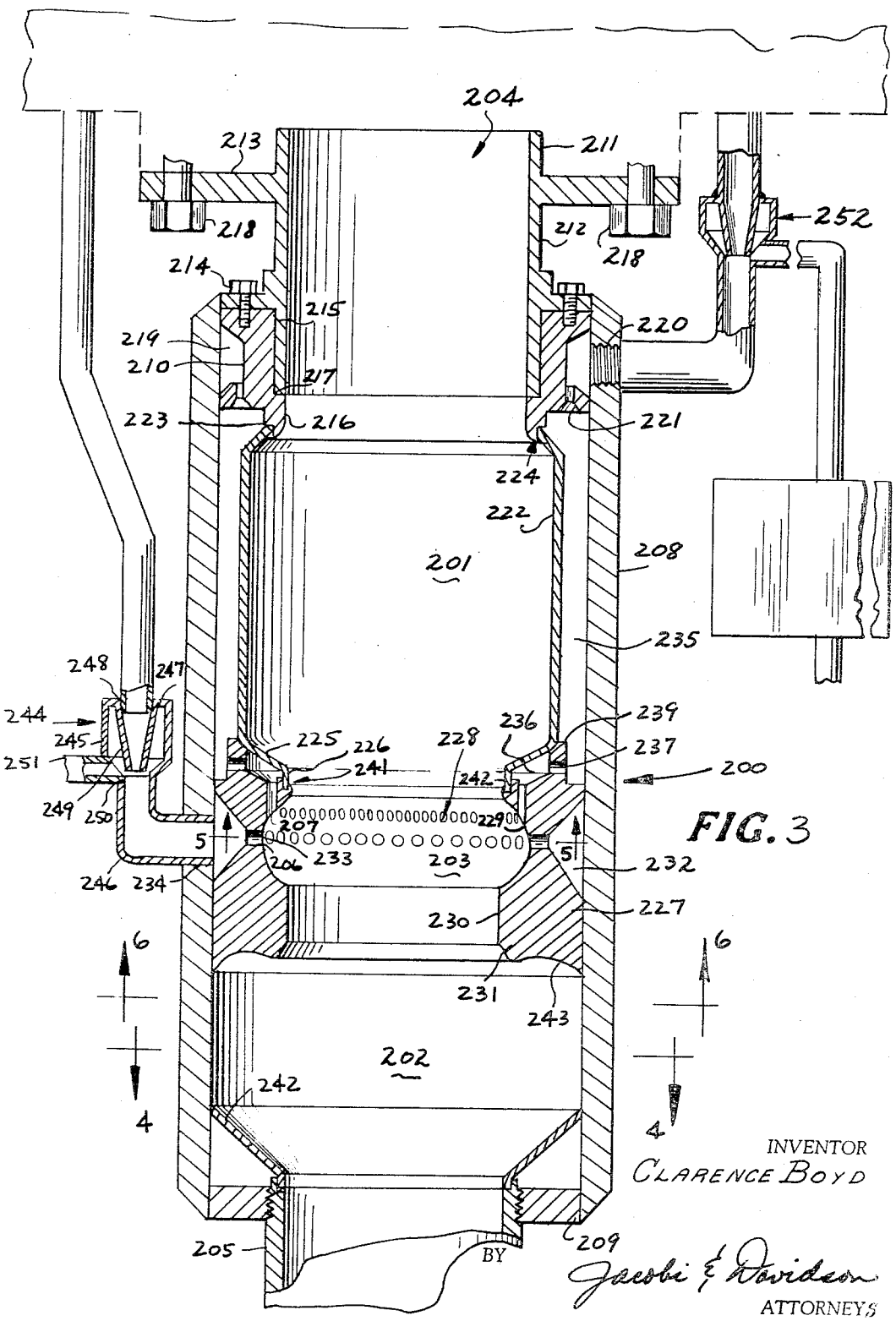
FIGURE 3 is a sectional elevational view of another embodiment of the present invention.
Figure 4:
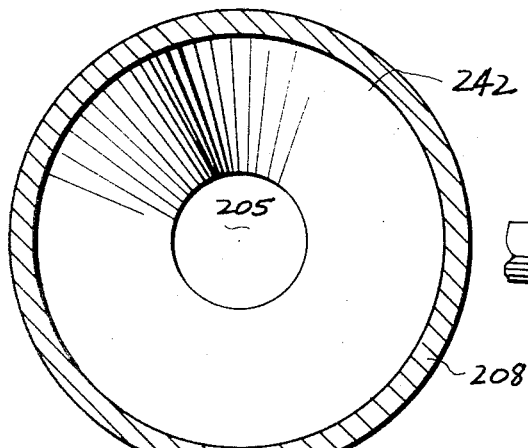
Figure 6:
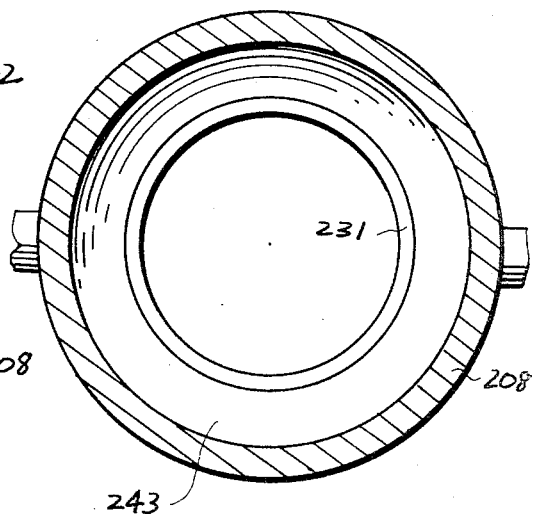
Figure 5:
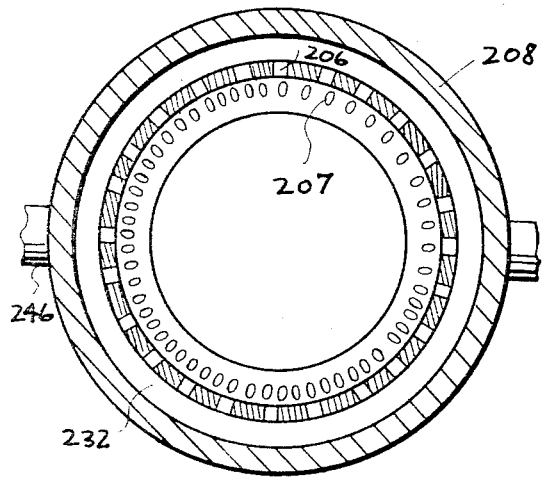
Figure 9:
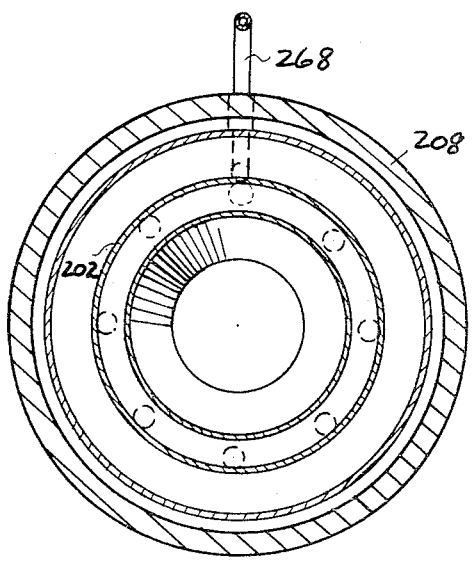
Figure 7:
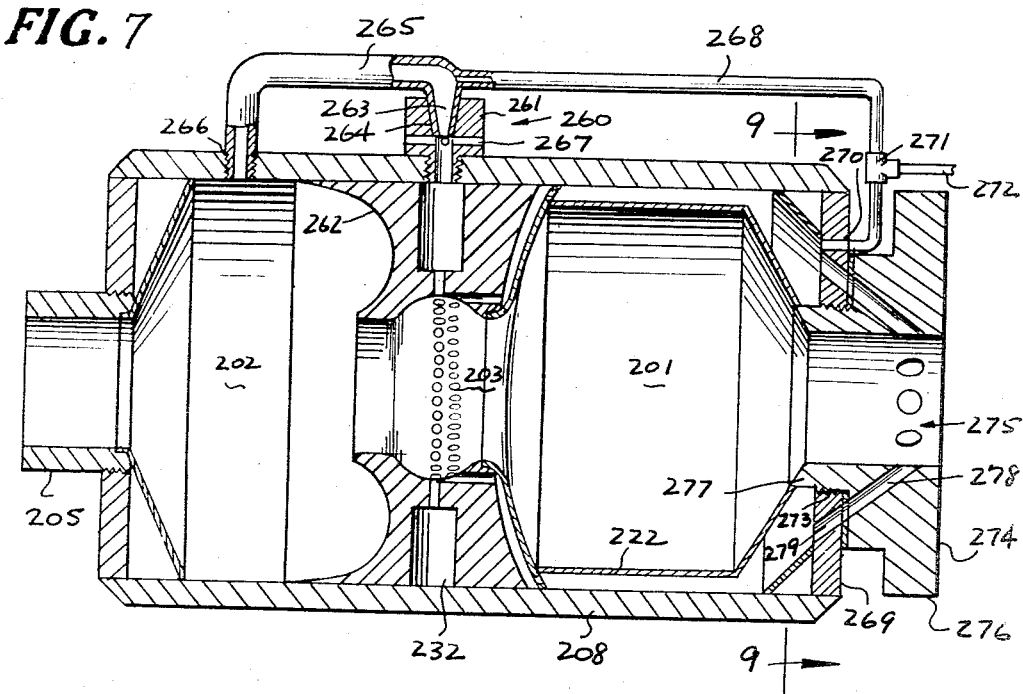
Figure 8:
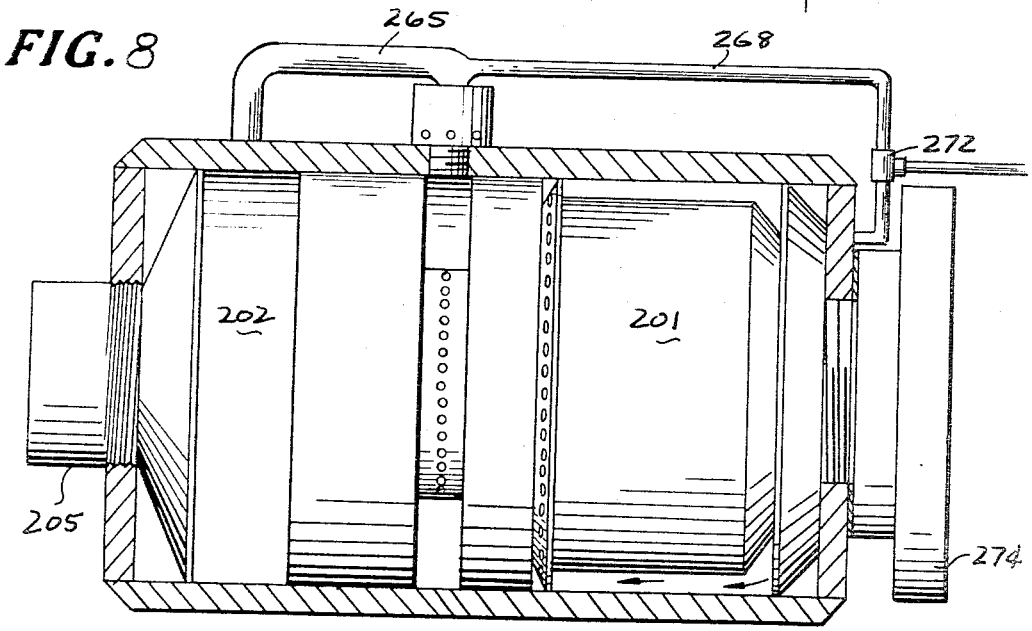
Figure 10:
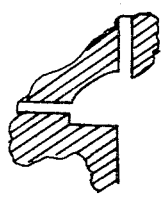

FIGURES 4, 5 and 6 are sectional views taken respectively along lines 4—4, 5—5 and 6—6 of FIGURE 3;

FIGURE 7 is a cross-sectional elevational view of a modification of the FIGURE 3 embodiment;

FIGURE 8 is a partial sectional view of the modification of FIGURE 7;

FIGURE 9 is a sectional view taken along the line 9—9 of FIGURE 7;

FIGURE 10 is a fragmentary sectional view of a modified form of air inlet for the embodiment of FIGURES 3–9;

FIGURE 11 is a cross-sectional elevational view of a still further, though non-preferred embodiment of the present invention;

FIGURE 12 is a sectional view taken along line 12—12 of FIGURE 11;

FIGURE 13 is an elevation, partially in section, of a modification of the embodiment of FIGURE 11;

FIGURE 14 is an elevation, partially in section, of a further modification of the embodiment of FIGURE 11;

FIGURE 15 is a cross-sectional elevational view of the modification of FIGURE 14;

FIGURE 16 is a sectional view taken along line 16—16 of FIGURE 15;

FIGURE 17 is an enlarged partial sectional view taken along line 17—17 of FIGURE 14;

FIGURE 18 is a cross-sectional elevational view of another modification of the embodiment of FIGURE 11;

FIGURE 19 is a sectional view taken along line 19—19 of FIGURE 18;

FIGURE 20 is a sectional view taken along line 20—20 of FIGURE 18; and

FIGURE 21 is a partial sectional view taken along line 21—21 of FIGURE 18.

GENERAL ASPECTS OF THE INVENTION

In a basic sense, the general aspects of the present invention and the manner in which the foregoing objects are attained is by providing a purification method and device which utilizes spontaneous combustion to accomplish the desired purification. To understand the significance of the term "spontaneous combustion" as used herein, it must first be understood that the term "combustion" itself refers to the rapid chemical combination of the combustible elements in a fuel with oxygen. In the present invention, concern is largely directed toward exhaust gases and fumes having a hydrocarbon content therein, with such hydrocarbon content constituting the "fuel" to be oxidized. The oxygen for the combustion process is derived from the air. Hence, in the present invention, the chemical combination which supports combustion is the mixture of exhaust gases and air, or more specifically, the hydrocarbon content of the exhaust gases with the oxygen of the air. Now, to appreciate the significance of the term "spontaneous," when used with the term "combustion," it must be recognized that, in the usual instance, some means must be provided to initiate ignition or combustion of a combustible chemical composition. Such means can take the form of a spark ignition mechanism or can even take the form of a chemical catalyst, which, when mixed with the combustible chemical composition, creates a thermo-chemical reaction, to initiate combustion. However, in contrast, a "spontaneous" combustion is a self-induced and self-sustaining combustion which is created solely by the combination of the exhaust gas hydrocarbons with oxygen, under certain specified conditions of gaseous fluid flow, and in the absence of any external means for initiating ignition. In other words, in its simplest sense, the term "spontaneous combustion" as used herein, refers to a combustion which is created merely by combining oxygen and hydrocarbons under the proper conditions to cause a self-induced ignition, i.e. creation of a fireball in the total absence of any separate chemical, mechanical or electrical ignition medium.

The present invention comprehends at least three relatively separate embodiments, each of which shares the basic principle underlying the invention, which is to accomplish exhaust gas purification through the utilization of spontaneous combustion.

In the preferred embodiment of invention, the purifier device has three spaced enlarged expansion chambers, with one venturi throat disposed between the first and second chambers and another venturi throat disposed between the second and third chambers, the venturi throats acting as mixing zones. Engine exhaust gases enter the first chamber, expand therein, then pass to the first venturi throat where they mix with crankcase exhaust fumes. The mixture of engine exhaust gases and crankcase exhaust fumes enters the second chamber, expands therein, then passes to the second venturi throat where it mixes with ambient air. The oxygen from the air, mixing with the gases and fumes, initiates a spontaneous combustion which creates a fireball within the second venturi throat. This fireball burns the hydrocarbon constituents present in the gaseous mixture, thereby leaving only non-contaminated gases which pass into the third chamber and expand therein. During such expansion in the third chamber, baffles create a reverse flow which directs the non-contaminated gases rearwardly to again contact the fireball, thereby providing a secondary burning action which burns off the contaminants, if any, which escaped the initial combustion. Finally, the purified gas stream exits from the device.

In another embodiment of invention described herein, which is similar to the preferred embodiment but somewhat simplified therefrom, two enlarged expansion chambers are provided, with a venturi throat being disposed therebetween and acting as a mixing zone. Engine exhaust gases enter the first chamber, expand therein, then pass to the venturi throat where they mix with both crankcase exhaust fumes and ambient air. The oxygen from the air, mixing with the gases and fumes, initiates a spontaneous combustion which creates a fireball within the venturi throat. This fireball continues somewhat as the gases expand into the second chamber whose shape is designed to create a turbulent flow therein. The purified gas stream then exits.

There is still another embodiment of the present invention which is not preferred, but which nevertheless, in a rudimentary fashion, accomplishes the basic objects of the invention, i.e., an exhaust gas purification through the utilization of spontaneous combustion. In this embodiment, an elongated pipe extends through a chamber, the pipe being connected to receive engine exhaust gases and the housing having opening means therein to admit ambient air. The pipe is provided with a small circumferential opening and juxtaposed thereto, an angularly diverging baffle plate extends from the pipe into the chamber. If desired, additional aperture means can be provided in the chamber and in the pipe to permit crankcase fumes to enter the chamber and ultimately enter the pipe. The coaction between the gases flowing through the pipe and the angularly diverging baffle plate causes the air from the chamber, and the crankcase fumes, if present, to be drawn into the pipe through the opening or openings therein. When such air mixes with the gases, it initiates a spontaneous combustion within the pipe, thereby purifying the gas stream. The principle of operation which governs the indrawing of the air from the chamber into the pipe is not fully understood. One theory advanced was the creation of standing or stationary waves in the pipe. Another possible theory is that the gas flow within the pipe creates a boundary layer along the walls thereof. The presence of the circumferential opening in the pipe is believed to give rise to the so-called separation phenomenon, a form of shock-induced interruption of the boundary layer which creates a small zone of turbulent flow. This turbulent flow is believed to draw the air inwardly from the chamber, thus causing the same to be mixed with the gas flowing through the pipe.

DESCRIPTION OF PREFERRED EMBODIMENT
(FIGURES 1 AND 2)

As shown in FIGURE 1, the device is generally designated 10 and includes an elongated tubular body 12 having an input coupling generally designated 14 at one end thereof, and an output coupling generally designated 16 at the opposite end thereof. The elongated casing or housing 12 is provided at its ends with a pair of end plates 18, 18 each of which has a central aperture therein for receiving and accommodating a coupling member.

The input coupling means 14 includes a tube 20 disposed through the central aperture of one end plate 18, and thus projecting partially into the housing 12 and partially beyond the end thereof. A radially extending flange 22 is provided on the end of the tube 20 which projects beyond the housing 12, to thus enable the device 10 to be coupled to the exhaust manifold of a standard internal combustion engine. An input passageway 24 extends, as a central bore, through the flange 22 and tube 20 to thereby permit engine exhaust gases, designated A to pass from the exhaust manifold into the device 10.

The output coupling means 16 includes a pipe portion 26 extending outwardly from the aperture in the opposite end plate member 18. This pipe 26 is provided at its outer ends with external threads 28, which gradually taper away from the housing 12. A plurality of longitudinal slits 30 extend from the outer end of the pipe section 26 toward the housing 12, but terminate short of the end plate member 18. The purpose of the output coupling means 16 is to attach the device 10 to a standard exhaust tail pipe, and to this end, a bushing 32, having a diagonal split 34 therein, is sized and shaped to be inserted interiorly of the pipe section 26. A lock nut 36, having tapered screw threads 38 designed to mate compatibly with the threads 28 on the pipe section 26, is provided for adjustably compressing the pipe section 26, and in turn, compressing the bushing 32. The exhaust tail pipe passes through a central opening 40 in the lock nut 36 and projects into the internal opening of the bushing 32. As the lock nut 36 is gradually tightened onto the pipe section 26, the slits 30 are gradually tightened onto the pipe section 26, the slits 30 are gradually compressed and in turn, the bushing 32 is gradually compressed until it tightly engages the tail pipe to retain the same in position. A locking ring 42 is provided to seal the interface between the end of the pipe section 26 and the locking nut 36.

A pair of block members 44 and 46 are provided within the housing 12, in spaced apart disposition between the end plate members 18. While each of the block members is substantially the same in construction, it is preferred that the block member 44 be fabricated of cast iron having a high nickel content, while the block member 46 be fabricated of aluminum having a high copper content. The block member 44 has an arcuately shaped rear face 48 and a somewhat less arcuately curved forward face 50, and similarly, the block member 46 has an arcuately shaped rear face 52 and a somewhat less arcuately shaped forward face 54. Each of the block members is provided to form a venturi throat within the device 10, and thus each has a central bore extending longitudinally between its opposed forward and rearward faces. In the block member 44, the venturi throat is formed by a central bore designated 56 while in the block member 46, the venturi throat is formed by a central bore designated 58. A concave annular groove extends around each venturi throat or central bore and communicates therewith, with such groove being disposed intermediate the forward and rearward faces of a block member. Thus, in the block member 44, an annular groove 60 having a concave configuration, communicates with the central bore 56 between the faces 48 and 50 on the block. A plurality of small circumferentially spaced holes 62, as can best be seen in FIGURE 2, extend longitudinally between the rearward face 48 and groove 60. Similarly, in the block member 46, a concave annular groove 64 communicates with the central bore 58, between the faces 52 and 54, and a plurality of circumferentially spaced holes 66 extend between the face 52 and the groove 64. The block members 44 and 46 are provided respectively with annular recessed grooves 68 and 70 between the block members themselves and the housing 12, such grooves providing, in effect, an insulation chamber to prevent rapid heat transfer from the block members to the housing.

For purposes to be presently described, three separate and spaced apart expansion chambers are provided within the device 10, such expansion chambers being designated 72, 74 and 76. The chamber 72 is circumscribed and defined by a wall section 78, preferably fabricated of copper or similar material, which at its forward end 80 fairs into the throat block 44 and at its rearward end is provided with a transversely extending flange 82 which secures to the inner end of the tube 20. Between its ends 80 and 82, the wall 78 is at least partially arcuately contoured, as shown at 84, with such contour corresponding substantially to the arcuate contour of the rear wall 48 on the block member 44. Although the expansion chamber 72 is formed interiorly of the wall 78, a passageway 86 is formed exteriorly of the wall 78, between the inner surface of the housing 12 and the rear face 48 of the block member 44. Thus, as can be seen, the passageway 86 communicates with the holes 62 in the block member 44.

The expansion chamber 74 is circumscribed and defined by a wall section 88 whose rear end 90 is faired into the block member 44 at its outer edges, and whose forward end 92 is faired into the block member 46 in communication with its central bore 58. As shown, the wall section 88 is at least partially arcuate in configuration, such arcuate portion being designated 94 and corresponding substantially to the arcuate configuration of the rear wall 52 on the block member 46. Thus, a passageway 96 is provided between the exterior of the wall portion 88, the housing 12 and the rear face 52 of the block member 6. Also, as shown, the passageway 96 communicates with the holes 66 in the block member 46.

Finally, the expansion chamber 76 is circumscribed and defined by a wall section 98 whose rear end 100 fairs into the forward face of the block member 46 at its outer edges, and whose forward end 102 fairs into the pipe 26. As was the case with the other expansion chambers, the wall 98 is arcuately contoured, at least in part, with such arcuate portion being designated 104. A first set of baffles 106 are provided at the beginning of the arcuate portion 104, and a second set of baffles 108 are provided at the end of such arcuate portion, the purpose of these baffles being to create a reverse flow of gases, in a manner to be more fully described hereinafter.

As can be seen, the forward end 80 of the wall section 78 and the forward end 92 of the wall section 88 blend or merge smoothly into their associated block members, thus assuring that flow out of the expansion chambers 72 and 74 will be directly into the central bores 56 and 58 which define the venturi throats in the device 10.

As previously described, it is also desirable for a device of this type to treat the fumes from the engine crankcase, as well as the exhaust gases from the engine itself, and to this end, an input tube 110 extends from the so-called "blow-by" connection of the crankcase and into the housing 12 in a chamber 112 therein. The chamber 112 is formed between the exterior of the tube 20, the interior of the housing walls 12, one end plate member 18, and the flange 82 on the walls of the expansion chamber 72. The crankcase fumes, designated B, flow through the tube 110 and into the chamber 112, which, as shown, communicates with the passageway 86. However, the rear end of the wall section 78 is provided with a small projecting flange portion 114 which further restricts the size of the passageway 86 at its connection with the chamber 112. Thus, although the fumes B may flow somewhat turbulently into the chamber 112, they will flow rather uniformly and smoothly therefrom, through the passageway 86, through the holes 62, and into the venturi throat in the block member 44.

Since it is the prime function of the device 10 to provide sufficient oxygen to cause a spontaneous combustion of the contaminated engine gases and fumes, it is necessary that a supply of oxygen be provided to the device 10. To this end, a plurality of openings 116 are arranged circumferentially about the housing 12, with such openings communicating with the passageway 96. A rotatable band member 118, having openings 120 therein is provided in surrounding relationship to the apertures 116, whereby rotation of the band relative to the housing can adjust the particular size of the input openings, and can thereby selectively control the amount of atmospheric air entering the device 10. When such air does enter from the atmosphere, it passes through the apertures 120 in the band 118, through the apertures 116 in the housing, into the passageway 96, through the holes 66 and into the venturi throat 58 of the block member 46.

In operation, the device 10 is attached or coupled to an internal combustion engine by means of the input coupling 14, and is provided at its opposite end with a conventional exhaust tail pipe coupled at 16. The exhaust gases A from the internal combustion engine flow in the direction of the arrow, through the passageway 24, and into the first expansion chamber 72. The gases A are permitted to expand in this chamber and they then pass to the venturi throat 56 in the block member 44. The crankcase exhaust fumes B flow in the direction of the arrow through the inlet pipe 110, into the chamber 112, and then through the passageway 86, through the holes 62 and into the groove 60, thereby also flowing to the venturi throat of the block member 44. The crankcase fumes B are mixed with the engine exhaust gases A in the venturi throat 56, thereby providing a mixed gas stream, which includes A and B. Both the gases A and fumes B have a hydrocarbon content, the quantity of which depends upon the running condition of the engine, as will be explained more fully hereinafter.

The mixed gas stream formed in the venturi throat 56 is permitted to expand into the second chamber 74 and to then pass to the venturi throat 58 in the block member 46. As is well known, when gases flow through a venturi throat, the pressure of the gas stream is reduced due to the increase in velocity thereof. Thus, at the venturi throat 58, this reduction in pressure creates a partial vacuum which draws air inwardly through the passageway 96, through the holes 66, and into the groove 64 which communicates with the venturi throat. The operating conditions of the device 10 are such that the heat of engine operation, air friction, road heat, and operation of the device 10 itself, tend to cause a heating effect which heats the device 10 and thereby pre-heats the air flowing inwardly through the passageway 96. As this pre-heated air combines with the mixed gas stream, during the mixing operation in the venturi throat 58, there is a spontaneous combustion of the gases, thereby creating a fireball in the venturi throat, such fireball being outlined in dotted lines and being designated F. As is apparent, this fireball F is not created by means of any external ignition apparatus, such as a spark plug, nor by the addition of any special chemical catalysts, but rather, the fireball F is created solely by the combination of the mixed gas stream A and B with the oxygen from the inwardly flowing pre-heated air.

The fireball F serves to effectively and completely burn all of the hydrocarbons in the mixed gas stream flowing through the venturi throat 58. Thus, only substantially non-contaminated gases leave the fireball F and expand into the chamber 76. However, during such expansion in the chamber 76, the baffles 106 and 108 create a reverse turbulent flow which returns a substantial portion of the gases into contact with the fireball F. Thus, if any hydrocarbons do manage to escape past the fireball F in the initial combustion operation, such hydrocarbons are effectively oxidized when the gases are returned to the fireball F on what may be deemed to be a secondary burning action.

When the gases again leave the fireball F and manage to pass the baffles 106 and 108, they exit through the pipe section 26 and through the exhaust tail pipe coupled thereto. These gases which leave the device through the tail pipe are effectively non-contaminated and are thus satisfactorily purified.

In congressional hearings relating to engine exhaust impurities, the Record of Hearings before the House of Representatives Sub-Committee considering H.R. 9368, sets forth on p. 33, certain information as to the hydrocarbon content encountered in the exhaust of a normal internal combustion engine, when the vehicle on which the engine is mounted is under different conditions of operation. With respect to the present invention, the following information is considered to be significant:

(a) When an automobile engine is idling, approximately .16 lbs. of hydrocarbons are produced in the exhaust per hour;

(b) When an automobile engine is operating at cruising speeds, approximately .44 lbs. of hydrocarbons are produced in the exhaust per hour;

(c) When an automobile engine is accelerating, approximately .76 lbs. of hydrocarbons are produced in the exhaust per hour;

(d) When an automobile engine is decelerating, approximately .36 lbs. of hydrocarbons are produced in the exhaust per hour.

The foregoing listed information is particularly pertinent when consideration is given to certain test results obtained with the structure of attached FIGURE 1. It has been found that if the expansion chamber 72 and mixing operations which is performed in the venturi throat 56 are eliminated, and only the chambers 76 and 78 and venturi throat 58 are used, the device does not operate with maximum efficiency particularly on acceleration and deceleration. When, however, the device is constructed as shown in FIGURE 1, then the inefficiency on acceleration and deceleration are eliminated.

Regardless of the particular operating condition, the expansion of the gases in the chamber 76 has been found to result in a cooler operation, and the use of the baffles 106 and 108 has been found to provide two beneficial results. The first result is the re-cycling of any exhaust gases which have left the fireball in the venturi throat 58 back to the fireball so that any remaining hydrocarbons can be burned before the gases leave the unit. The second beneficial effect is stabilization of the fireball due to the reverse flow of the gases created by the baffles 106 and 108.

For any particular engine with which the device 10 is used, it may be found that control of air entering venturi throat 58 requires adjustment for the most efficient operation. For some engines, relatively more air may be required, and for other engines, relatively less air may be required. The use of the adjustment band 118 gives a simple means of providing an initial adjustment whereby the unit can be coupled with any given engine, and then reset so as to operate most efficiently with that particular engine.

Experiments have further indicated that a certain short warm-up time may be required until the components of the unit and the exhaust gases reach sufficient temperatures to sustain the spontaneous combustion. The warm-up time has been found to be between 27 and 30 seconds in almost all instances. Once the proper temperatures are reached, the unit continues to operate as described and the temperature reaches an equilibrium value after approximately two or three minutes. The grooves 68 and 70 prevent heat from rapidly transferring from the block members 44 and 46, and such block members, and particularly block member 46, thus act as heat retaining sources or sinks.

The above test results and hydrocarbon content information have given rise to the following theory of operation for the present invention.

When the engine is idling, the hydrocarbon content of the exhaust gas stream is sufficiently low that the hydrocarbons can generally be eliminated with a minimum burning. Accordingly, the fumes B, entering from the crankcase, merely provide for more burning without any particularly significant effect.

When the engine is cruising, there is a sufficient hydrocarbon content in the gas stream to sustain proper combustion in the venturi throat 58, and here again the gases entering from the crankcase are merely cumulative, and yield a greater burning.

In the instance of idling, as well as in the instance of cruising, the use of the gases from the crankcase could be eliminated. However, it is desirable to burn all waste hydrocarbons and thus burning all of the hydrocarbons leaving the crankcase, as well as those in the main exhaust, has its beneficial effects insofar as the ultimate result is concerned.

When consideration is given to acceleration and deceleration conditions, however, the use of the fumes B from the crankcase becomes important from an operational standpoint. On the deceleration, there is a substantial hydrocarbon content in the gas stream, but this hydrocarbon content apparently is not sufficient to alone sustain an efficient spontaneous combustion in venturi throat 58. The hydrocarbon content is sufficiently large that it cannot be handled as easily as the hydrocarbon content during idling, and yet it is lower than the hydrocarbon content existing when the vehicle is cruising. To sustain an efficient spontaneous combustion at the venturi throat 58 apparently requires more of a hydrocarbon content in the gas stream than that contained in the exhaust gas stream during deceleration. Thus, the operative effect of the hydrocarbon content of fumes B from the crankcase, as mixed with the gases A in the venturi throat 58, is apparently that of providing a sufficient hydrocarbon level in the combined gas stream to yield efficient spontaneous combustion in the venturi throat 58 during deceleration. In essence, the hydrocarbon content of the gases A, and the resulting hydrocarbon content is sufficient to sustain efficient spontaneous combustion in the venturi throat 58. Without the additive effect, the hydrocarbon content on deceleration apparently would be too low itself to sustain efficient spontaneous combustion, and too high to cause an efficient elimination of the hydrocarbons by merely some combustion, as is the case during idling. The use of the "blow-by" hydrocarbons, or fumes B, thus gives an additive effect yielding the efficient operation during deceleration.

On acceleration, the fumes B also have an additive effect, but the operational effect apparently is somewhat different from that which results during deceleration. The hydrocarbon content of the exhaust gases A on acceleration is sufficiently high that spontaneous combustion in the venturi throat 58 alone will apparently not eliminate all of the hydrocarbon gases. However, it has been found that when the hydrocarbon content of the fumes B is added to the hydrocarbon content of the exhaust gases A in the venturi throat 56, during an acceleration operation, there may be some minor spontaneous combustion at the venturi throat 58, due to the presence of a minor amount of unburned oxygen, present in the gas stream from induction by the carburetor. This might be regarded as an initial pre-heating combustion, but this combustion apparently eliminates some of the hydrocarbons in the mixture of gases A and B during acceleration. Without the addition of the gases B, there would not be sufficient hydrocarbon content to cause the spontaneous combustion at the venturi throat 56, but with the addition of the gases B, there is apparently a sufficient hydrocarbon content to cause the initial combustion, if sufficient oxygen is entrained in the gas stream, and this initial combustion appears to eliminate an amount of hydrocarbons in excess of the hydrocarbons added by the fumes B. Thus, in effect, the introduction of the fumes B in the venturi throat 56, during an acceleration operation, causes a reduction in the hydrocarbon content of the gases leaving the venturi throat 56, whereby the remaining hydrocarbon content can be efficiently handled by the fireball created by spontaneous combustion at the venturi throat 58.

From the above discussion, it should be apparent that the use of the crankcase fumes B apparently has no appreciable effect during idling of an engine on a vehicle which utilizes the device 10 of the present invention, or during cruising of such a vehicle. However, during deceleration, the fumes B apparently serve to provide a sufficient hydrocarbon content in the gas stream to maintain an efficient single spontaneous combustion, and during acceleration the fumes B apparently serve to support a pre-burning operation, as well as a primary burning operation.

DESCRIPTION OF ALTERNATIVE EMBODIMENT
(FIGURES 3–10)

In a basic sense, this alternative embodiment corresponds to the structure disclosed in the preferred embodiment, except that the first expansion chamber, first block member, and hence the first venturi throat, are all eliminated. Instead, a single block member and a single venturi throat is provided in this embodiment, with the engine exhaust gases, crankcase fumes and ambient air all being combined, mixed, and spontaneously ignited at the single venturi throat. As previously explained, this form of embodiment is generally satisfactory, but does not operate with maximum efficiency during acceleration and deceleration.

As shown in FIGURE 3, the alternative embodiment of device is generally designated 200 and includes a first expansion chamber or heating chamber 201, a second expansion chamber or firepot 202, and an interconnecting mixing zone 203. The heating chamber connects with the exhaust manifold of an internal combustion engine through an inlet passageway 204 and the firepot expels purified exhaust through an outlet pipe 205. Fresh air is introduced into the exhaust stream at the mixing zone 203 through inlets 206 and crankcase fumes or vapors are also admitted to the mixing zone through openings 207.

These inner operating areas and members are surrounded by a cylindrical tubular casing 208. The ends of the casing are closed with a first end member 209, and a second end member 210 which is recessed from the end of the tube. An interchangeable tubular inlet adapter 211 fits into the recess between end member 210 and the end end of casing 208 and the adapter in turn secures the device to the exhaust manifold of an engine. The adapter 211 has a cylindrical tube 212 which carries a flange 213 corresponding in shape to the flange of the manifold and also has a circular flange 214 having the same diameter as the interior of the tubular casing 208. The end member 210 has an interior circular opening, the outer portion 215 of which is of the same diameter as the tubular portion of the adapter 211, and an inner portion 216 of which is of a slightly reduced diameter thus providing a shoulder 217 at the point which the diameter is reduced. The tubular portion of the adapter fits into this opening and rests against the shoulder and the lower circular flange 214 is bolted to the end member 210 by bolts 218 and 218'. Preferably the inner portion of the interior opening has the same diameter as the interior of the adapter 211.

There is an annular channel 219 in the outer side of the end member 210, a passageway or distributor for crankcase fumes, and there is an opening 220 through the wall of outer casing 208 in communication with the distributor 219 for introduction of crankcase fumes. In the inner part of the end member 210, there are radially spaced openings 221 which permit crankcase fumes to flow from the distributor toward the mixing zone 203.

The heating chamber 201 is circumscribed and defined by a tubular divider wall 222 which is generally cylindrical and, in its central portion, is of a diameter about 1½–2 times the interior diameter of inlet adapter 211. At its ends, the divider wall 222 necks down substantially to the diameters of the inlet 204 and the mixing zone 203. At its outer end, the divider wall 222 is tapered to meet the inner portion 216 of the end member 210. The tapered portion is substantially at an angle of 37° to the central axis of the device and is convex, having a radius of curvature of 4 inches. The end member 210 is provided at its terminus with a small external shoulder 223, against which the top edge of the divider abuts. For a snug fit, the lower end of the member 210 can be flared outwardly and upwardly against the divider, pressing it against shoulder 223, as shown at 224. At the inner end, the divider wall 222 is faired into the mixing zone, and has an outward curvature at 225 which terminates in a reverse curve and a narrow neck 226 forming, in cross-section, an S-shaped curve. The curvature at 225 is gradual at a radius of about four inches for a device having an outside diameter of 4 inches.

The mixing zone 203 is within a heat-retaining block member 227 which has openings for introduction of both crankcase fumes and air. The block 227 is tubular with a central bore or passage 228 having generally no more than ½ the diameter of the block 227. This bore 228 defines the venturi throat for the device 200. At one end of the throat 228, a concave annular groove 229 is formed. Beyond the groove 229, the throat has a generally straight-walled bore section 230, which may flare out slightly at the end 231 opening into the fire pot 202. The air inlet to the mixing zone comprises an annular recess 232 in the outer wall of the heat-retaining block 227 which tapers into radially-spaced openings 233 leading into the center of the annular groove 229. An opening 234 in the wall of the tubular casing 208 permits the annular recess 232 to receive ambient air.

The crankcase fumes flowing toward the mixing zone 203 are preheated by heat exchange with exhaust gas expanding into the heating chamber 201. There is an annular passageway 235 between the cylindrical casing 208 and the tubular divider 222, with such passageway communicating with the openings 221 in the upper end member 210 to thereby receive crankcase fumes from the recess 219. At the inner end of the heating chamber, as the divider terminates at 225, there is a narrow passageway 236 between the divider and the heating block 227. The passageways 235 and 236 are connected by openings 237 passing through a small supporting ridge 239 at the end of heat-retaining block 227. A plurality of circumferentially spaced longitudinally extending openings 207 extend through the block member 227 to permit the crankcase fumes to flow into the annular groove 229, to blend in and mix with air entering the groove through openings 233.

The heat-retaining block 227 also provides an inner mounting for the divider 222. To this end, there is provided a short straight section which is counterbored at 240 to provide a small shoulder. The shoulder is slightly wider than the thickness of the divider so that its face extends inwardly beyond the interior of the divider wall. This face may be swaged up against the lower edge of the divider, as shown at 241. The divider also rests against the small ridge 239 near the outer edge of the heat-retaining block 227.

The second expansion chamber or firepot 202 is defined by the inner walls of cylindrical casing 208, the end of the heat-retaining block 227 and by a conical baffle 242. The baffle is press-fitted at one end into the end of outlet pipe 205 which is threaded into lower end plate 209 and flares angularly outwardly therefrom to merge into the walls of the housing 208. The end of the heating block 227 is inwardly concave to provide a semicircularly cross-sectioned annular recess 243 which aids in gas circulation in the chamber 202.

In the method for introduction of air shown in FIGURE 3, there is an aspirator 244 having a cylindrical outer shell 245 which tapers into an elbow tube 246, welded or otherwise secured to the cylindrical casing 208 and thus communicating with opening 234. The end of the shell 245 is covered with a plate 247 having a central opening 248 which carries a depending, inwardly-extending conical inlet tube 249 which decreases in cross-section as it extends into the interior of shell 245. The conical tube terminates at a point adjacent the tapered joint between shell 245 and elbow tube 246. As gas flows through the inlet, it is accelerated so that it leaves the lower end of the inlet at high velocity and, hence, reduced pressure. There is an opening 250 through the wall of the shell 245 adjacent the lower end of inlet tube 249 and a tube 251 communicating with this opening and extending laterally to induct ambient air. Air is drawn through this tube 251 and opening 250 in accordance with well established principles of aspiration.

The same type of aspirator can be employed for introduction of crankcase fumes, and such aspirator can be generally designated 252 and can connect to the lateral tube on the crankcase vent. However, there generally should be a check valve at the crankcase, so that vapors are drawn off only when the pressure in the crankcase reaches a pre-set maximum.

In both aspirators 244 and 252, the inlet is connected through tubing to openings in the exhaust manifold. The amount of air or crankcase vapor drawn is controlled by the size of this tubing which regulates the amount of pressure applied to the aspirator inlet and the size of the opening at the lower end of conical tube 249. For the ordinary size of engine employed for automobiles, ⅜" or ½" flexible copper tubing provides approximately correct pressure. If it is necessary, there can be a small restriction in the connecting tubing to reduce the pressure or a small conical insert can be dropped into tube 249, to reduce the diameter and increase the pressure drop. It is also possible to use a surge tank between the crankcase and the device, which tank may take the form of cylindrical vessel 1½ inches in diameter and 2 inches long. It is further possible to regulate the supply of air to the device by means of a damper in the air inlet tube 251. A damper is a small pivotally mounted plate which is urged to an upright position by a spring, to thereby close the tube 251. However, suction in the aspirator 244 can pull the plate to an open position when the engine operates at high speed and a large amount of air is required but as the suction is reduced when the engine decelerates or idles, the plate closes. This reduces the amount of air which reaches the mixing zone as the exhaust volume decreases. Furthermore, at idle speed, the temperature of the exhaust gas may be lower and reduced air flow is required at this time to avoid extinguishing the exhaust gas oxidation.

A somewhat modified form of device, although still a part of this embodiment, is shown in FIGURES 7–10. In this modification, the crankcase fume and air induction means differ somewhat from those described in connection with FIGURES 3–7.

The air inlet shown in detail at 250 in FIGURE 7 is of the aspirator type. A block 261 is screwed into a threaded opening 262 in cylindrical casing 208 which communicates with annular recess 232. There is a passage 263 through the block 261, such passage having a uniform narrow diameter at its inner half and an outwardly flaring outer half which connects to an enlarged inlet 264. A short tube 265 connects the inlet 264 to the chamber 202, passing through an opening 266 through the wall of casing 208. Gas under pressure flows through tube 265 and is accelerated in the tapering inlet 264, due to a venturi action, thereby causing a reduction in pressure. There are lateral openings 267 through the block 261 which communicate with the end of tapering inlet 264 and air is drawn through these openings.

The tube 265 also supplies pressure from the chamber 202 through an auxiliary pressure tube 268 to facilitate introducing crankcase fumes into the device. The tube 268 leads to an end plate 269 and connects through an opening 270 therein to the passageway 235 surrounding the heating chamber 201. There is a T-joint 271 in tube 258 connecting to a tube 272 which leads to the crankcase.

The end plate and manifold connection are also shown modified in FIGURE 7, particularly for use when space is limited. The end plate 269 is pressed into the cylindrical casing 208 and is provided with a threaded central opening 273. The manifold connectors 274 also has a central opening 275 and is circular and of stepped pyramid external shape. The widest portion 276 is adapted for attachment to an engine block and the narrowest portion 277 is externally threaded and screwed into the opening 273.

Passageways 278 are provided in the manifold connector 274 to connect the opening 273 to the passageway 235 through aligned openings 279 in the end plate 269. It will be apparent that this construction avoids the need for separate tubing connections to a manifold and that it will be particularly useful for one cylinder engines.

The materials used are considered of importance. The heat-retaining block 227 is selected to have a combination of heat capacity and conductivity. It should not heat too slowly, but should retain heat reasonably well so as to function as a heat sink. A preferred material is aluminum or aluminum alloy ST machinable 54 or ST machinable 27. A high nickel steel alloy has been used with some success. The divider 222 is preferably fabricated of copper, although phosphorus bronze is also suitable. In fact, the combination of copper and aluminum is believed to be superior and has produced good results. While not fully understood, it is thought that this may be the result of a galvanic effect because of the different galvanic potentials of aluminum and copper. Another possible explanation is that copper readily absorbs heat and transfers it to the aluminum.

Typical dimensions of the device of FIGURE 3 are shown in Table 1, where the device is adapted for use with a diesel engine.

In operation, the device 200 is bolted to the engine exhaust manifold and the aspirators 244 and 252 are appropriately connected thereto. The engine exhaust gases flow through the passageway in the adapter 211 and expand into the heating chamber 201. Such exhaust gases then pass from the chamber 201 into the venturi throat 228 in the block member 227. Simultaneously, the aspirator 252 draws crankcase fumes into the annular channel 219, from which they pass through holes 221 into the annular passageway 235 surrounding the heating chamber 201. The exhaust gases expanding in heating chamber transfer heat to the crankcase fumes in the passageway 235 to pre-heat the same, such heat being transferred first to the divider wall 222 and then in turn to the crankcase fumes flowing therearound. The pre-heated crankcase fumes then pass through radial holes 237 and into the passageway 236 between the divider wall portion 225 and the block member 227. Also simultaneously, the aspirator 244 draws air inwardly into the annular recess 232 between the block member 227 and the casing 208. Since, as previously described, the block member acts as a heat sink or heat retaining means, such heat is transferred to the air in the recess 235 to pre-heat the same.

As is well known, when gases flow through a venturi throat, the pressure of the gas stream is reduced due to the increase in velocity thereof. Thus, as the engine exhaust gases flow through the venturi throat 228, a reduction in pressure is created, with such reduction in pressure serving to create a partial vacuum which draws the crankcase fumes through the holes 207 and into the venturi throat, and which also draws the air through the holes 233 and into the venturi throat. As is apparent, the exhaust gases, crankcase fumes and air all combine and are initially mixed in the annular concave groove portion 229 of the venturi throat 228. Such mixing and combining results in a spontaneous combustion which creates a fireball in the venturi throat 228, such fireball being located approximately in the portion 230 thereof. As is apparent, such a fireball is not created by means of any external ignition apparatus, such as a spark plug, nor by the addition of any special chemical catalysts, but rather, the fireball is created solely by the combination of the exhaust gas stream with the preheated crankcase fumes and the oxygen from the preheated air.

The fireball serves to effectively and completely burn all of the hydrocarbons in the gaseous mixture formed in the venturi throat 228. Thus, only substantially non-contaminated gases leave the fireball and expand into the second expansion chamber or firepot 202. Because of the arrangement of the baffle 242 in the firepot 202, and because of the dish-shaped curvature 243 on the face of the block 227, a somewhat swirling or reverse turbulent flow is created in the chamber 202. This reverse turbulent flow redirects a substantial portion of the gases into contact with the fireball for a secondary burning action which effectively oxidizes any hydrocarbons which might have initially escaped the fireball. The non-contaminated and purified gases then leave the chamber 202 and exit through the outlet pipe 205.

The device 200 has been subjected to tests on both 1 and 6-cylinder four-cycle engines of about 100 and 225 cubic inch displacement, respectively. The engines were operated both with gasoline and with gasoline blended with outboard motor oil. In some cases, additional oil or outboard motor oil was added to the crankcase and the choke was closed, all for the purpose of increasing the tendency of the engines to smoke. Nevertheless, there was virtually no smoke or unpleasant odor emitted. Furthermore, the engines have been operated in a closed room, but the carbon monoxide content of the room did not rise significantly. The maximum concentration observed was one part in one hundred thousand.

The aspirator 244 has also been demonstrated to be operative. When the device is in use, a lighted candle can be held adjacent the air inlet. The flame is drawn into the inlet. Peculiarly, however, in some cases there appears to be a counter-current flow of exhaust gas and air in the inlet. That is, if the candle is held a short distance from the inlet, it is blown away. However, if it is held near the edge of tube 251, it is drawn in along the inner wall of tube 251. It is believed that the low pressure at the lower end of the conical tube 249 causes the air to be drawn in, but, in the cases in which this unusual phenomenon is observed, the velocity of the gas flowing from tube 249 carries a part of it outwardly through tube 251. The small amount of exhaust gas escaping in this manner is, of course, of no consequence. If desired, its release can be avoided by reducing the size of tube 249. It is also possible to raise and lower conical tube 249 so that the lower end of the tube is above or below the air inlet tube 251. This alters the amount of suction. To achieve this, the outside of the tube may be cylindrical and threaded, the opening 248 is also threaded and a bolt is used to lock tube 249 in position.

Various changes may be made in the structure. It is possible, for example, to omit the curvature of the divider at 225, although the amount of smoke expelled is increased slightly when this is done. It is also possible to omit the recess at 229 and inject air and crankcase vapors directly into the exhaust stream. However, a combustion flame shoots out from the outlet end of the device, if this is done. The recess 229 may also be modified so that its lower wall near straight-walled portion 230 is flat rather than a continuation of the curve. The flat portion may form an angle of 85° with straight-walled portion 230, as shown in FIGURE 10. It is also possible to interchange the inlets from the crankcase and for air so that crankcase fumes flow through the heat-retaining block and fresh air flows through the passageway 235. The inner wall of casing 208 surrounding the firepot may be lined with copper for increased heat transfer to heat-retaining block 227 and to protect the casing from oxidation.

TABLE I
Typical dimensions for device 200

| | Inches |
|---|---|
| Outside diameter of casing 208 | 4½ |
| Thickness of casing 208 | ⅛ |
| Length of casing 208 | 8 |
| Depth of distributor 219 | 1 |
| Width of passage 235 | ⅛ |
| Width of passage 236 | ³⁄₆₄ |
| Length of heat-retaining block 227 [1] | 2⅞ |
| Depth of annular recess 232 | ½ |
| Inside diameter of recessed position 229 of mixing zone 203 | 3 |
| Radius of curvature of recessed portion of mixing zone 203 | ⅝ |
| Inside diameter of straight-walled passage 230 | 2 |
| Length of straight-walled passage 230 | 1¹⁄₁₆ |
| Inside diameter of heating chamber 210 from inlet to outlet | 3⅞ |
| Length of largest diameter part of heating chamber 201 | 2¼ |
| Length of firepot 202 from inlet to outlet | 1¾ |
| Angle between baffle 242 and lower end plate 209 [2] | 37½ |
| Inside diameter of inlet adapter 211 | 2 |
| Inside diameter of outlet pipe 205 | 2 |
| Diameter of air inlets 206—36 holes | ³⁄₁₆ |
| Radius of curvature at 225 | 4 |
| Angle between tapering part of divider at 225 and axis of purifier [2] | 37½ |
| Length of narrow neck portion of divider coaxial with mixing zone at 226 | ⅝ |

[1] Should be about as long as straight-walled part of chamber 201 (divider 219) and at least as long as inside diameter of passage 230, preferably 1½ to 2 times as long.
[2] Degrees.

DESCRIPTION OF FURTHER ALTERNATIVE, THOUGH NON-PREFERRED, EMBODIMENT (FIGURES 11-21)

There is still a further alternative embodiment of the present invention, shown in FIGURES 11-21, and although this embodiment is somewhat crude and none-preferred, it nevertheless, in a rudimentary fashion, accomplishes the objectives of the present invention.

Referring now to this non-preferred embodiment, there is shown in FIGURE 11 a device generally designated 300 which includes a straight pipe 301 having flange fittings 302 and 303 at its ends for attachment to the engine block and exhaust manifold respectively and a slot 304, intermediate the ends, and extending around the pipe, through which fresh air is drawn into the pipe as exhaust gases flow through. A chamber 305 surrounds the pipe enclosed by a cylindrical casing 306 and flat, annular end walls 307 and 308 which are welded or otherwise secured to the pipe 301 and the casing 306. The end plate 307 is perforated at 309 with one or more holes to admit air into the chamber and there is a curved plate baffle 310 extending around the pipe and generally outwardly from the upstream edge of slot 304 to near the inner face of casing 306, at an angle of about 37.5 degrees from the axis of the pipe, thus subdividing the chamber 305 into smaller chambers 311 and 312.

The baffle plate 310 must be of a highly heat-conductive metal such as copper about ¹⁄₁₆ inch thick. Certain kinds of aluminum alloys have also been tested with some success, but are not as satisfactory as copper. When the baffle plate is brass, satisfactory destruction of the exhaust gas is not achieved. The thickness of the plate should not be much less than ¹⁄₁₆″ since this would reduce its heat conductivity. The other parts of the apparatus shown in FIGURE 11 can be made of any suitable metal such as brass or steel.

The size of the inlet slot 304 is believed to be somewhat critical. ¹⁄₆₄ inch has been suitable in some cases and in other cases the size has been increased to ¹⁄₃₂ inch with satisfactory results. However, when the size increases to as much as ¹⁄₁₆ inch, the air does not flow through the slot at the proper rate of speed and the purifier does not operate at its high efficiency. The distance between end plate 307 and the outer edge of baffle plate 310 should be at least about 1½ inch and that between the baffle plate and end plate 308 no more than about ¾ inch. If the latter distance is increased significantly, it is believed that too much back pressure of air is built up in this space and part of the heating effect of the baffle plate 310 is lost as air remains there before entering pipe 301. The distance between the outer edges of the baffle plate and the inner surface of cylindrical casing 306, also must be small, and may vary from .040 inch to .0625 inch, but should not differ from this range to any considerable extent.

The 37.5 degrees angle between the baffle plate and the axis of pipe 301 is believed to be critical and small variations result in a departure from optimum results. For example, increasing the angle to only 40 degrees caused a significant loss in efficiency.

Other dimensions are considered less critical. Straight pipe 301 may be about 1.00 to 1.50 inches in diameter depending on the size of the engine exhaust port and the outer casing 306 about 3.00 to 4.250 inches in diameter. Of course, these dimensions are for engines of a size normally found in automobiles and somewhat smaller engines used for rotary lawn mowers or somewhat larger truck engines. Variations would obviously be appropriate when the size of the engine departs from this considerably, unless, of course, several devices were used together.

A modified version of this construction is shown in FIGURE 13 in which chamber 311 is filled with a packing such as glass wool 313. This device has been found to operate satisfactorily in a manner similar to that of FIGURE 11.

As a further modification, it has been found desirable to couple the exhaust purifier to the crankcase. In this way, hot oil vapors that normally are expelled from the crankcase into the atmosphere through the breather cap are burned in the device. This serves to further reduce the amount of hydrocarbon material expelled into the atmosphere, and to improve the efficiency with which exhaust gases are burned. The added fuel supplied by the crankcase vapors considerably increases the amount of heat generated in the device and tends to assure that combustion temperatures will be maintained in the device at all times. A construction embodying such a modification is shown in FIGURES 14–17. The straight pipe which has the narrow slit described above, is designated at 314 and the flange connections are shown at 315 and 316. The outer chamber indicated at 317 is enclosed by cylindrical casing 318 and end plates 319 and 320, welded respectively to the cylindrical casing 318 and the straight pipe 314. The air inlet holes into chamber 317 are shown at 321 passing through end plate 319.

To provide for introducing crankcase fumes into the straight pipe, there is a cylindrical divider 322 within cylindrical casing 318 extending parallel to the straight pipe from end plate 319 to form between itself and the straight pipe 314, a passageway 323 for the flow of such vapors and a passageway 324 for air between the divider and the cylindrical casing 318. There is a second opening 325 in the end plate 319 communicating with passageway 323 and crankcase vapors are admitted through this opening to be drawn into the straight pipe 314. Suitable connections to the crankcase are shown generally at 326.

In place of the baffle plate 310, there are a block 327 and a curved plate 328 spaced a short distance from each other and separated by a narrow space 329 leading to the opening in straight pipe 314. Both block 327 and plate 328 extend around the straight pipe and outwardly therefrom to the cylindrical casing 318, being welded or otherwise secured, and the end face of block 327 and the plate 328 which faces it are at an angle of about 37.5 degrees from the axis of the straight pipe. There is an opening 330 for air through the outer part of block 327 communicating with passageway 324 and the outer end of the narrow space 329 and another opening 331 for crankcase vapors connecting passageway 323 with the narrow slot at a point near the end of opening 330.

Block 327 may be an aluminum alloy such as ST Machineable 54. Plate 328 is preferably of the same material as plate 310, and the width of narrow space 329 is about 0.040 to 0.625 inch. Opening 330 may be about 1/16 inch across, and is not too critical and opening 331 should be about 1.030 to 0.050 inch.

In some cases, it has been found desirable to provide additional control for the amount of air and crankcase fumes introduced into the purifier. One simple arrangement is the damper plate shown at 332 which fits flush against the end plate 319 and has openings 333 and 334 which coincide with openings 321 and 325. The plate is mounted rotatably on the straight pipe 314 so that it can be turned to move the various openings into and out of alignment to regulate the rate at which air and crankcase vapors flow into the device. Of course, separate baffle plates can be used to permit separate control of the air and crankcase vapors, and other types of valves may be used.

In addition to prevent backfiring from the device to the crankcase, a ballast chamber (not shown) can be placed in the line leading to the crankcase, with a check valve adjusted to close when pressure in the line between the ballast chamber and the device increases beyond some predetermined limit.

A further modification is shown in FIGURES 18–21 wherein the crankcase fumes are introduced into the straight pipe directly rather than being first mixed with fresh air as shown in FIGURES 14–17. In this modification, the straight pipe in which exhaust gases are burned is an assembly of several sections, as shown in FIGURE 18.

The device has an inlet pipe 336, shown with pipe threads for attachment to an engine by suitable means, a flat end plate 337 secured to and extending outwardly from pipe 336, an outlet pipe 338, and an annular flat plate 339 extending from its inner end which serves as one end closure plate of the device. An outer cylindrical casing 340 encloses the mixing and burning parts and is welded to the end plates 337 and 339.

The interior of the inlet end of the device is subdivided into a central passageway 341 for exhaust gases, an annular passageway 342 for crankcase fumes and an outer annular passageway 343 for air, and these passageways are separated by tubular members 344 and 345, both secured to plate 337. The inner tube 345 has openings 346 passing through it at angles, as shown, to permit crankcase vapors to be drawn into the exhaust gases, from the annular passageway 342, and the end of tube 345 is cut away on its inner face at 347 to provide part of a passageway for air entering the straight pipe.

There are openings 348 and 349 in end plate 337 communicating with annular passageways 342 and 343 to permit crankcase fumes and air to enter, and opening 348 is connected to the crankcase by tubing as shown at 350.

At the inner ends of tubular members 344 and 345, there is an annular block 351, secured to both of the tubular members and having its inner edge cut away to a diameter approaching that of the cut-away part of tube 345. There are openings 352 through the outer portion of the block, communicating with annular passageway 343 for air and leading to a point near the outer edge of the opposite face of the block, which is at an angle of about 37.5 degrees to the axis of the straight pipe.

As in the modification of FIGURES 14–17, there is a curved plate 353 generally parallel to the end face of block 351, with a space 354 separating them, secured, at its outer edge to cylindrical casing 341. The inner end of the plate terminates in tubular member 355 which extends along the inner edge of block 351 and the cut-away part 347 of tube 345, to form a passageway 356 for air which flows through openings 349, annular space 343, openings 352, space 354 and passageway 356.

The dimensions of this modification are the same as those of FIGURES 14–17.

While the above description refers to straight pipes, the reaction zone need not be straight and the pipe may be curved or have any shape which does not impede the free flow of exhaust gases. The modified devices of FIGURES 14–21 may be also operated without connection to the crankcase in a manner similar to the purifier of FIGURES 11–13.

Before fully describing the operation of the embodiment of FIGURES 11–21, some consideration must first be given to the manner in which the air and/or crankcase fumes in the chamber are drawn into the straight pipe and mixed with the exhaust gases flowing therethrough. In the previously described embodiments of FIGURES 1–10, venturi throat means was used to create the partial vacuum needed to draw such air and fumes inwardly to mix with the exhaust gases. However, in this embodiment, no venturi throat is utilized, but the device nevertheless operates satisfactorily.

One theory of the manner of operation of this embodiment is that standing waves or stationary waves are set up in the straight pipe. This is similar to the stationary waves set up in organ pipes as described, for example, in the textbook "Principles of Physics," vol. 1, by Francis Weston Sears, 1944, pp. 498–503. In this phenomenon, air forms waves in a closed pipe and certain points along the pipe known as nodes remain fixed. These are points of lower pressure so that when they coincide with the opening in the straight pipe, there will be a suction. It will be appreciated that the air propelled from an internal combustion engine moves in pulses which are released as the various exhaust valves open in sequence. This pulsation is believed to cause the formation of such standing waves.

Another theory of the manner of operation of this embodiment is that the exhaust gases flowing through the straight pipe create a boundary layer effect along the walls thereof. However, the smooth wall of the pipe is interrupted by the circumferential opening which communicates the interior of the pipe with the surrounding chamber. The presence of this circumferential opening is believed to give rise to the so-called separation phenomenon, as described, for example, in the book "Principles of Guided Missile Design," section I on Aerodynamics, by E. Arthur Bonney, pp. 25, 26, published 1956 by D. Van Nostrand Co., Inc. In this phenomenon, the presence of the opening creates a shock-induced "separation" of the boundary layer from the walls of the straight pipe. Such separation creates a condition of low energy turbulence in the area of the opening, such turbulence causing air and/or fumes from the chamber to be drawn inwardly and mixed with the exhaust gases flowing through the straight pipe.

With this understanding in mind, it can now be appreciated that pre-heated air and/or crankcase fumes can be drawn into the straight pipe to mix with the exhaust gases flowing therethrough. As a result of such mixture, a spontaneous combustion occurs within the straight pipe, thus creating a fireball which burns the hydrocarbons in the mixed gas stream. As is apparent, this fireball is not created by any external ignition apparatus, such as a spark plug, nor by the addition of any chemical catalysts, but rather, the fireball is created solely by the combination of the engine exhaust gases and crankcase fumes with the oxygen from the inwardly flowing pre-heated air. Since the hydrocarbons are burned by the fireball, those gases leaving the device 300 are non-contaminated and purified.

After reading the foregoing detailed description, it should be apparent that the objects set forth at the outset of this specification have been successfully achieved. Accordingly,

What is claimed is:

1. A method of exhaust gas purification comprising the steps of:
   introducing the exhaust gas to be purified into a first confined area;
   passing said exhaust gases from said first confined area into a first expansion chamber having a diameter in excess of said first confined area;
   permitting said exhaust gases to expand in said first expansion chamber;
   flowing said exhaust gases from said expansion chamber to at least one mixing zone having a restricted diameter less than that of said expansion chamber;
   communicating said mixing zone with the atmosphere to obtain an air supply;
   flowing said exhaust gases through said mixing zone at increased velocity, thereby creating a reduced pressure which draws air from the atmosphere into said mixing zone;
   permitting said exhaust gases and said air to mix and combine in said mixing zone to thereby cause spontaneous combustion which creates a fireball in said mixing zone;
   flowing said exhaust gases from the fireball in said mixing zone into a second expansion chamber having a diameter in excess of that of said mixing zone;
   permitting said exhaust gases to expand in said second expansion chamber;
   returning at least a portion of said expanded gases in said second expansion chamber into contact with said fireball for a secondary combustion effect; and
   exciting said exhaust gases from said second expansion chamber into a second confined area having a diameter smaller than that of said second expansion chamber.

2. A method of exhaust gas purification as defined in claim 1 further comprising the steps of directing crankcase exhaust fumes to a third confined area juxtaposed to said mixing zone and communicating said mixing zone with said third confined area whereby exhaust gas flow through said mixing zone draws said crankcase fumes thereinto.

3. In a device for attachment to an internal combustion engine to purify gaseous emissions from said engine; the combination comprising:
   a casing having at least two spaced apart internal expansion chambers;
   each of said expension chambers having at least a partially arcuate configuration;
   venturi means disposed between said expansion chambers;
   said venturi means having a throat therein providing communication between said chambers;
   said throat having a maximum diameter less than the maximum diameter of said expansion chambers;
   means defining a passageway juxtaposed to said venturi means;
   said passageway communicating with the atmosphere to receive a supply of air;
   said venturi means having at least one opening means therein extending between said passageway and said throat;
   means coupling one of said expansion chambers to the exhaust manifold of said engine to receive exhaust gases therefrom, said exhaust gases expanding into said chamber;
   said exhaust gases flowing from said chamber to said venturi throat to thereby create therein, a reduced pressure which draws air from said passageway through said opening means and into said throat;
   said air and exhaust gases combining in said throat to cause a spontaneous combustion which creates a fireball therein, said fireball serving to burn the impurities in said exhaust gases;
   said burned exhaust gases flowing from said fireball to said second expansion chamber and expanding therein;
   means in said second expansion chamber to redirect at least a portion of the gases expanded therein back to said fireball for secondary burning; and
   exhaust means for exiting purified gases from said second expansion chamber.

4. The combination defined in claim 3, further including means for receiving crankcase fumes and for combining the same with said exhaust gases for burning by said fireball.

5. The combination defined in claim 4 wherein said means for receiving crankcase fumes includes a further passageway juxtaposed to said venturi means for receiving said crankcase fumes and additional opening means in said venturi means extending between said further passageway and said throat, whereby said crankcase fumes are drawn from said further passageway into said throat as exhaust gases flow through said throat.

6. The combination defined in claim 4 wherein said device includes three spaced expansion chambers defining first, second and third chambers, with an additional venturi means between said first and second chambers and with said venturi means between said second and third chambers.

7. The combination defined in claim 6 wherein said means for receiving crankcase fumes includes an additional passageway juxtaposed to said additional venturi means, said additional venturi means having additional opening means therein between the throat thereof and said additional passageway for drawing said crankcase fumes from said passageway to mix with said exhaust gases in said throat.

8. An exhaust gas purification device for an internal combustion engine comprising:
  a casing having an inlet end adapted to be coupled to the exhaust manifold of said engine and an outlet end opposed thereto;
  said casing having therein spaced apart first, second and third expansion chambers;
  first venturi means including a restricted throat disposed between said first and second expansion chambers;
  second venturi means including a restricted throat disposed between said second and third expansion chambers;
  said engine exhaust gases flowing through said chambers and venturi means in transit from said inlet end to said outlet end;
  means for directing crankcase fumes from said engine into juxtaposition to said first venturi means;
  said first venturi means having at least one opening therein extending from said throat to admit said crankcase fumes thereinto as said engine exhaust gases flow therethrough, thereby assuring a mixture of exhaust gases and crankcase fumes;
  means for directing atmospheric air into juxtaposition to said second venturi means;
  said second venturi means having at least one opening therein extending from said throat to admit air thereinto as said mixture of exhaust gases and crankcase fumes flows therethrough, thereby causing a spontaneous combustion which creates a fireball in said throat.

9. An exhaust gas purification device as defined in claim 8 wherein said third expansion chamber includes baffle means for rearwardly directing at least a portion of the gases expanding therein, to direct the same back into contact with the fireball in said second venturi throat.

10. An exhaust gas purifier for removing smoke and odors from the exhaust gases of internal combustion engines comprising an inlet pipe, means for attaching said inlet pipe to the exhaust outlet of an internal combustion engine, an enlarged chamber wider than said inlet pipe and communicating with said inlet pipe, an enclosed mixing chamber narrower than said enlarged chamber and communicating with said enlarged chamber at a point remote from said inlet pipe, means for introducing pre-heated air into said mixing chamber, an enlarged firepot communicating with said mixing chamber and an outlet from said firepot at a point remote from said mixing chamber, the mixing chamber being surrounded by an enlarged solid heat-retaining block having passages therethrough for pre-heating air, said passages opening into said mixing chamber.

11. An exhaust gas purifier for removing smoke and odors from the exhaust gases of internal combustion engines as set forth in claim 10 including means for pre-heating crankcase vapors and introducing said vapors into the mixing chamber.

12. An exhaust gas purifier for removing smoke and odors from the exhaust gases of internal combustion engines as set forth in claim 11 in which there is a recess in the wall of said heat-retaining block adjacent the mixing chamber and in which said air passages and said crankcase introduction means communicate with said recess so that air and crankcase vapors blend with each other in the recess as they meet exhaust gases entering the mixing chamber.

13. An exhaust gas purifier for removing smoke and odors from the exhaust gases of internal combustion engines comprising:
  a tubular casing;
  an inlet pipe at one end of the casing;
  an enlarged heating chamber within said casing but spaced from the walls thereof, connected to and communicating with said inlet pipe, said heating chamber being enclosed by a divider of a heat-conducting metal which defines a narrow passageway between itself and said casing for flow of crankcase vapors to be introduced into the exhaust gas the cross-sectional area of said heating chamber perpendicular to the path of flow of exhaust gas therethrough being substantially larger than the corresponding cross-sectional area of said inlet pipe;
  an enlarged solid heat-retaining block within said casing and surrounding a mixing chamber;
  said mixing chamber comprising a central opening passing through said heat-retaining block, connected at one end to and communicating with said heating chamber at point remote from said inlet pipe, and having a cross-sectional area perpendicular to the path of flow of exhaust gas therethrough substantially the same as the inlet;
  said heat-retaining block having openings therethrough communicating with said mixing zone for pre-heating air by heat exchange with said block and for admission of air to the mixing chamber;
  means connecting said narrow passage with the mixing chamber for admission of crankcase vapors;
  a firepot comprising an enlarged chamber communicating with the other end of the central opening in the heat-retaining block which comprises said mixing chamber and having a cross-sectional area perpendicular to the path of flow of exhaust gas therethrough substantially larger than the corresponding cross-section of said mixing chamber;
  an outlet pipe communicating with said firepot at a point remote from said mixing zone and having a cross-sectional area perpendicular to path of flow of exhaust gas therethrough aproximately the same as the inlet;
  air inlet means communicating with said air-admitting openings through the heat-retaining block for introduction of air;
  and means for introducing crankcase vapors into said narrow passageway.

14. An exhaust gas purifier for removing smoke and odors from the exhaust gases of internal combustion engines as set forth in claim 13 in which the wall of the heat-retaining block surrounding the central opening therethrough is recessed and in which the air-admitting openings and the means for admission of crankcase fumes into the mixing chamber communicate with said recess to permit mixing of air and crankcase vapors in the recess as they meet exhaust gases passing through said central opening.

15. An exhaust gas purifier for removing smoke and odors from the exhaust gases of internal combustion engines as set forth in claim 14 in which said recess is approximately semicircular in cross-section.

16. An exhaust gas purifier for removing smoke and odors from the exhaust gases of internal combustion engines as set forth in claim 13 in which the firepot is cylindrical, one end thereof being a wall of the heat-retaining block adjacent the outlet end of the mixing chamber.

17. An exhaust gas purifier for removing smoke and odors from the exhaust gases of internal combustion engines as set forth in claim 16 in which said wall of the heat-retaining block at one end of the firepot has an annular curved recess and in which the opposite end of the firepot is a conical baffle plate in contact with the outer edge of the cylinder and having a central opening communicating with the outlet pipe.

18. An exhaust gas purifier for removing smoke and odors from the exhaust gases of internal combustion engines as set forth in claim 16 in which at least one of said inlet means includes an aspirator comprising:
  a first tube having a constricted portion for reducing the pressure of gas flowing through the tube;
  a second tube opening laterally into the constricted portion of said first tube so that gas is drawn through the second tube by the low pressure generated in the constricted portion;

and means for connecting said first tube with the exhaust manifold of an engine, whereby exhaust gas flows into the first tube and is accelerated to provide suction for secondary gases.

19. An exhaust gas purifier for removing smoke and odors from the exhaust gases of internal combustion engines as set forth in claim 13 in which said heat-retaining block comprises aluminum and the divider surrounding said heating chamber comprises copper.

20. An exhaust gas purifier for internal combustion engines comprising a pipe, said pipe having an opening through its wall, outer walls secured to said pipe forming an enclosed chamber surrounding said pipe and in communication with said opening, a baffle plate secured to said pipe adjacent said opening and extending outwardly therefrom, at an angle of about 37½ degrees to the axis of said pipe, to within a short distance of one of said walls, said baffle overlying said opening and subdividing said chamber, one of said walls having an opening therethrough for admission of air into the part of said enclosed chamber separated by the baffle from the openng in said pipe, whereby air is drawn into said chamber, across said plate and through the opening in said pipe to oxidize exhaust gases flowing therethrough.

21. An exhaust gas purifier as set forth in claim 20 in which said baffle is copper.

22. An exhaust gas purifier as set forth in claim 20 in which the distance between said baffle and said outer wall is from about 0.040 inch to about 0.0625 inch.

23. An exhaust gas purifier as set forth in claim 20 in which the width of the opening in said pipe is about 1/64 to about 1/32 inch.

24. An exhaust gas purifier as set forth in claim 20 including glass wool packing in part of said chamber.

25. An exhaust gas purifier as set forth in claim 20 in which the pipe is a straight pipe.

26. An exhaust gas purifier as set forth in claim 20 in which the opening into said pipe is a slot extending circumferentially around the pipe.

27. An exhaust gas purifier for internal combustion engines comprising a pipe, said pipe having an opening through its wall, outer walls secured to said pipe and forming an enclosed chamber surrounding said pipe and in communication with said opening, one of said outer walls having an opening therethrough for admission of air to the chamber, a baffle plate secured to said pipe adjacent said opening and extending outwardly therefrom at an angle of 37½ degrees to the axis of said pipe and a block secured to said pipe adjacent said opening and opposite said baffle plate, said block extending outwardly from said pipe, the outer portion of said block being secured to the outer portion of said plate to enclose therebetween a narrow space communicating with said opening, said block having an opening therethrough connecting said enclosed chamber with said narrow space, whereby air is drawn into said chamber, through the opening in said block, through said narrow space and into the exhaust gases flowing through the pipe.

28. An exhaust gas purifier as set forth in claim 27 in which the face of the block opposite said plate is parallel to said plate and spaced therefrom a distance of about 0.040 to about 0.0625 inch.

29. An exhaust gas purifier as set forth in claim 28 including a divider in said chamber to sub-divide said chamber into two passageways, one of said passageways communicating with the opening in said outer wall and the opening in said block, one of said outer walls having a second opening therethrough communicating with the other of said passageways, said block having a second opening therethrough connecting said other passageway with said narrow space, and means for connecting the second opening in said outer wall to an engine crankcase.

30. An exhaust gas purifier as set forth in claim 29 in which the second opening in said block opens into said narrow space at a point near the first opening.

31. An exhaust gas purifier as set forth in claim 27 including a tubular member extending from the inner end of said baffle plate and generally along the axis of said pipe, spaced from the inner edge of said block to form a passageway in communication with said narrow space and said pipe through which air flows into said pipe.

References Cited by the Examiner
UNITED STATES PATENTS

| | | |
|---|---|---|
| 1,756,897 | 4/1930 | Bilsky. |
| 2,203,554 | 6/1940 | Uhri et al. |
| 2,677,231 | 5/1954 | Cornelius _____ 60—30 |

MARK NEWMAN, *Primary Examiner.*

SAMUEL LEVINE, RALPH D. BLAKESLEE, CARLTON R. CROYLE, *Examiners.*

A. S. ROSEN, *Assistant Examiner.*